Figure 1:
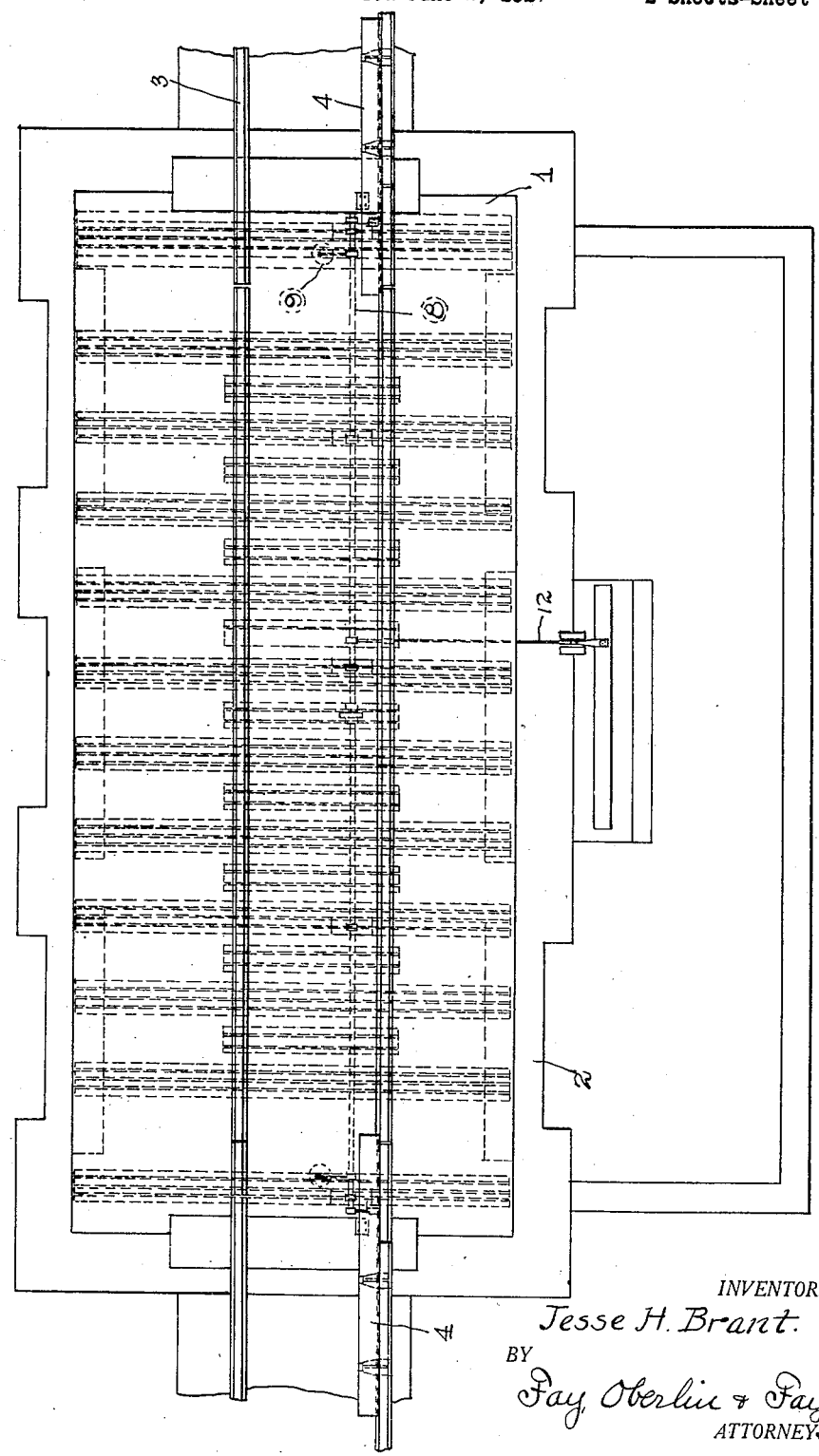

March 18, 1930.  J. H. BRANT  1,750,623
LOCKING DEVICE FOR WEIGHING SCALES
Filed June 2, 1927  2 Sheets-Sheet 1

INVENTOR.
Jesse H. Brant.
BY
Fay, Oberlin & Fay
ATTORNEYS.

March 18, 1930.  J. H. BRANT  1,750,623
LOCKING DEVICE FOR WEIGHING SCALES
Filed June 2, 1927  2 Sheets-Sheet 2
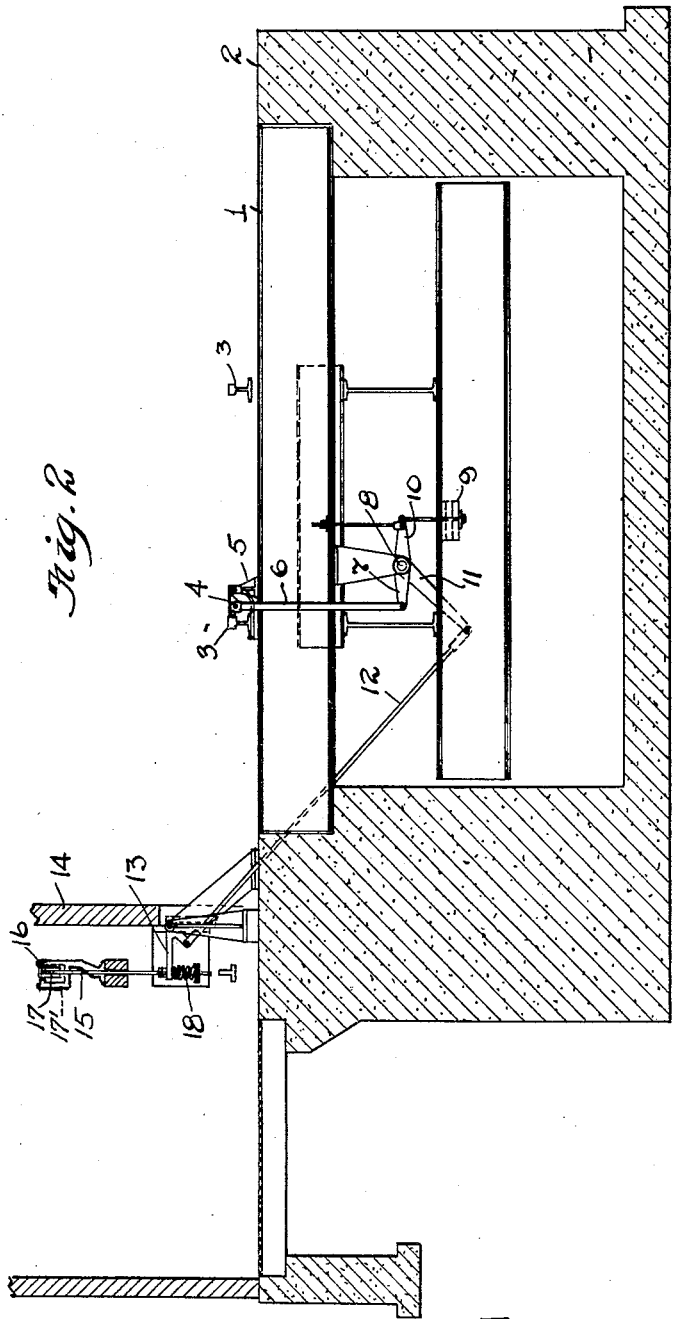
INVENTOR:
Jesse H. Brant
BY
Fay, Oberlin & Fay
ATTORNEYS.

Patented Mar. 18, 1930

1,750,623

UNITED STATES PATENT OFFICE

JESSE H. BRANT, OF YOUNGSTOWN, OHIO

LOCKING DEVICE FOR WEIGHING SCALES

Application filed June 2, 1927. Serial No. 195,936.

This invention relates to scales, and more particularly to control of scales of the beam type; and it is among the objects of the invention to provide a construction facilitating accuracy of weighing and without interfering with rapid operation. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail certain construction embodying the invention, this however, being illustrative of but one of the various ways in which the principle of the invention may be employed.

In said annexed drawings:—

Fig. 1 is a plan view of a track-scale embodying the invention; and Fig. 2 is a vertical transverse section.

Referring more particularly to the drawings, the numeral 1 designates a scale-platform mounted in a pit provided by the walls 2, and carrying railway-track rails 3, all as in a well known manner. At the end of the platform, and preferably both ends, particularly where loads are to be brought onto the scale from either direction, a trip 4 is movably mounted closely adjacent the rail head, such trip being depressible in a limited range of movement, for instance being hinged to support standards 5. Connecting from the trip members are links 6 extending to lever-arms 7 fastened to a common rock-shaft 8 which is mounted underneath longitudinally of the platform. Counterweights 9 pendant from lever arms 10 on the rock-shaft are provided for normally maintaining the trip members in raised position. Connecting from the rock-shaft is a link and lever system comprising conveniently a lever-arm 11, link 12 and a bell crank lever 13 extending into the weigh-house 14 to engage a reciprocable rod 15 carrying at its upper end a catch 16 adapted to engage the scale beam 17, which beam may be of any usual construction. The usual beam-guard 17' surrounds the beam. A buffer and take-up spring 18 is provided at the lower end of the rod 15.

It will be observed that the location of the trip is such that it lies in the path of a load coming upon the scale, particularly the car wheel flanges, and it is retained in depressed position until such flanges pass therebeyond. Accordingly as a load is set forward onto the scale, the wheel flanges depressing the trip 4, through the rock-shaft 8 throw the lever-arm 11 downwardly, and in turn the bell crank lever 13 is also drawn down, whereby the catch 16 on the rod 15 holds the scale beam, thereby locking it against movement, until the trip 4 is released and returns to normal position, whereupon the scale beam is also correspondingly released. In this manner, the load to be weighed automatically locks the scale beam while being set into position, and the scale beam is released for functioning only when the load has cleared the trip members and is thereby accurately centered on the scale platform. Cars to be weighed may thus be rapidly spotted onto the scale platform and the weighing operation proceed quickly without distraction of the attention of the weigh-man to avoid inaccurate placement in positioning. In a similar manner of course also scale platforms for wagons or trucks may be provided with trip control.

Other modes of applying the principle of the invention may be employed, change being made as regards the details disclosed, provided the means stated in any of the following claims, or the equivalent of such, be employed.

I therefore particularly point out and distinctly claim as my invention:—

1. In a weighing scale, the combination of a scale-platform, a scale-beam, and means including a catch controlled by the load to be weighed for holding the beam inoperative until the load is placed properly on the platform.

2. In a weighing scale, the combination of a scale-platform, and means depressible by wheels carrying a load on to the platform, said means being connected to maintain the scale inoperative until the load is centered properly.

3. In a weighing scale, the combination of a scale-beam, a scale-platform, a trip in the path of a load going onto the platform, and a connection between said trip and said scale-beam for holding the beam inoperative until the load is centered properly.

4. In a weighing scale, the combination of a scale-beam, a scale-platform, a trip depressible in the path of wheels carrying a load onto said platform, means for normally holding the trip up, and a link and lever system actuated by the depression of said trip for holding the scale beam until the load passes said trip.

5. In a weighing scale, the combination of a scale-beam, a scale-platform, a trip at each end of the platform depressible in the path of wheels carrying a load onto the platform, a counterweight normally holding the trips up, and a link and lever system actuated by the depression of said trips for holding the scale-beam until the load passes to proper center position.

6. In a weighing scale, the combination of a scale-beam, a scale-platform, track rails on said platform, a trip adjacent the rail at each end of the platform depressible by the flanges of wheels on the rails, counterweights for normally holding the trips up, a rock-shaft connected in common to said trips, and a link and lever system connected with said rock-shaft whereby the depression of a trip holds the scale-beam until the load passes to central position.

7. In a weighing scale, the combination of a scale-beam, a catch adapted to hold said beam, a scale-platform, track rails on said platform, a trip adjacent the rail at each end of the platform depressible by the flanges of wheels on the rails, counterweights for normally holding the trips up, a rock shaft connected in common to said trips, and a link and lever system connected with said rock-shaft and said scale-beam catch whereby the depression of the trip holds the catch against the scale beam until the load passes to central position.

Signed by me this 31st day of May, 1927.

JESSE H. BRANT.